J. M. FISKE.
METHOD OF TREATING QUEBRACHO.
APPLICATION FILED JUNE 19, 1912.

1,081,730.

Patented Dec. 16, 1913.

WITNESSES:
Helen E. Koelsch
Eli Weill

INVENTOR
Josiah Mason Fiske
BY
Geo. H. Benjamin
ATTORNEY

UNITED STATES PATENT OFFICE.

JOSIAH MASON FISKE, OF NEW YORK, N. Y.

METHOD OF TREATING QUEBRACHO.

1,081,730.          Specification of Letters Patent.     Patented Dec. 16, 1913.

Application filed June 19, 1912. Serial No. 704,520.

*To all whom it may concern:*

Be it known that I, JOSIAH MASON FISKE, a citizen of the United States, residing at New York city, in the county and State of New York, have invented certain new and useful Improvements in Methods of Treating Quebracho, of which the following is a specification.

The solid extract of quebracho is now a commercial commodity, and is largely used in tanning. This extract is prepared by macerating wood and then evaporating the solution in a vacuum apparatus. The solid extract contains from 60 to 65 per cent. of soluble tannins, the balance representing moisture and various insoluble bodies.

The practice, heretofore, for treating the solid extract to fit it for use, has consisted in introducing the solid extract into a body of water, then heating, and finally drawing off the solution of the soluble matters; or alternatively, introducing the solid extracts into baskets and moving the baskets through a body of warm water until the soluble matters have gone into solution, leaving the insoluble matters in the basket. Both of these methods have proven unsatisfactory, for the reason that if the solid extract is subjected to the action of hot water and in the presence of the atmosphere, the tannin gradually changes its form and becomes insoluble, which renders it useless for tanning.

The purpose of my invention, therefore, is a method by reason of which the solid extract can be converted into a fluid extract, free from the insoluble matters, and in which the treatment will not increase the proportion of insoluble matters.

Figure 1:
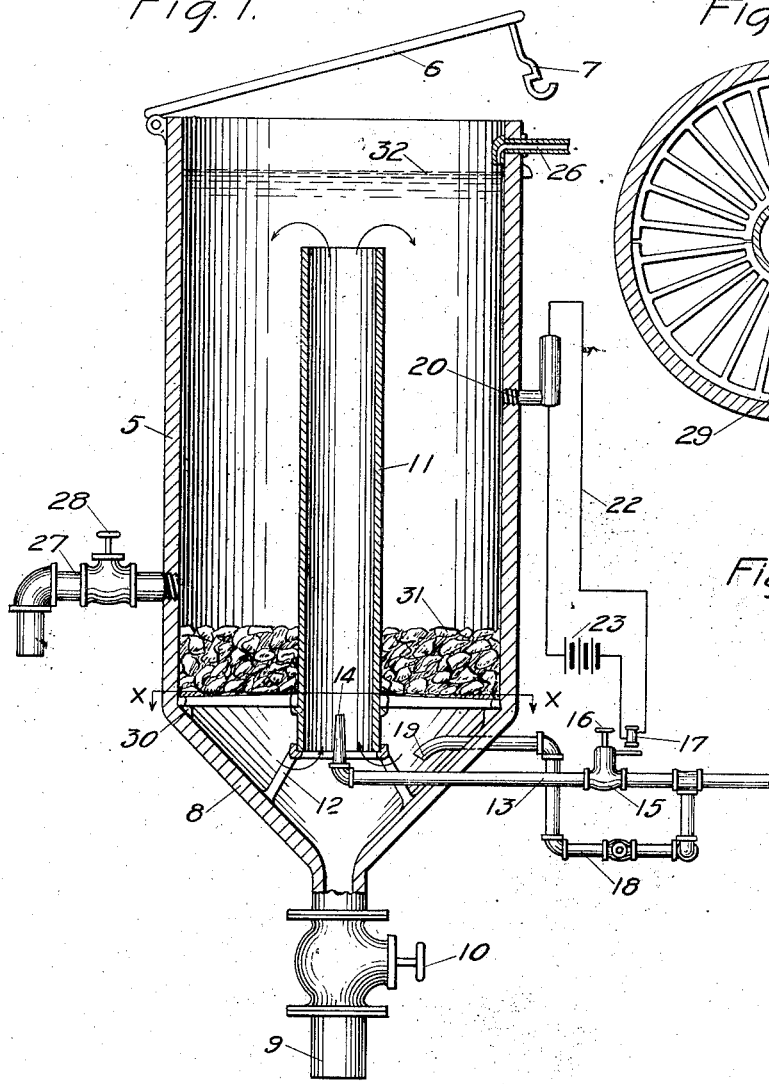
Figure 2:
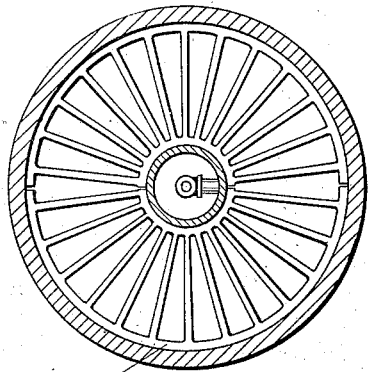
Figure 3:
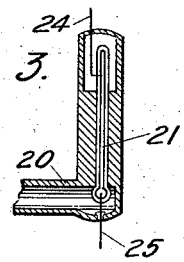

The accompanying drawings will serve to illustrate the apparatus which I prefer to use, and in which, Figure 1 is a vertical section through the apparatus with the various pipes shown in elevation, and also diagrammatically representing the connection of the apparatus in a thermostatic electric circuit. Fig. 2 is a transverse section and plan view taken on the line X—X of Fig. 1. Fig. 3 is a vertical section through the thermostatic apparatus showing its connection to the vessel.

The drawings are in a sense diagrammatic and are not intended to show specific details of construction, as it is within the intent of my invention, so far as the method is concerned, to use any apparatus through the instrumentality of which the method can be carried out.

In the drawings, 5 indicates a cylindrical vessel provided with a cover 6, adapted to be fastened by means of a catch 7. The bottom of the vessel preferably has the shape of an inverted cone 8; from the bottom of which leads a delivery pipe 9 to carry off the insoluble material, controlled by a valve 10. Located centrally within the vessel is a tube 11, open at the top and bottom and supported upon a standard 12. The top of tube 11 is shown as located below the fluid level in the vessel.

13 indicates a steam pipe provided with a nozzle 14 projecting upward into the tube 11. Located in the pipe 13 is a valve 15 adapted to be controlled by both a hand wheel 16 and magnet 17.

18 indicates a steam pipe having a delivery orifice 19 located within the vessel 5. Pipes 13 and 18 are connected to any suitable source of steam (not shown). Situated about midway in the vessel is a tube 20 carrying a thermostatic device 21.

22 represents a local circuit; 23, battery. The terminals of the local circuit are connected to the terminals 24—25 of the thermostatic device. Magnet 17 is included in the local circuit.

26 is a steam pipe connected to the top of the vessel.

27, a delivery pipe controlled by the valve 28. Situated at the bottom of the vessel, just above the top of the conical portion, is a screen 29, preferably made in two parts for the facility of removal, and supported upon offsets 30 secured to the shell of the vessel.

The method of effecting the solution is as follows: A certain quantity of the solid extract of quebracho 31, is placed upon the screen 29. The vessel is then filled with water, indicated at 32, until the vessel is approximately seven-eighths full, and the cover 6 closed and fastened. The water is preferably at the temperature of the atmosphere, but may be previously heated. After the water is introduced, steam is introduced through the pipe 13 and nozzle 14. The introduction of the steam serves to increase the heat of the water and to produce a circulation of the water up through the tube 11 and downward in the vessel, as indicated by the arrows. The thermostatic device is set for 175° Fahrenheit. So long as the water is below 175° Fahrenheit, the steam will be allowed to enter. When it reaches the temperature stated, the thermostat closes the local circuit, the magnet 17 attracts its armature, and closes the valve 15, thus shutting off the entrance of further steam until the temperature drops below 175°.

It will be seen from the above description that the access of air to the solution is prevented, and that the water is circulated through the solid extract of quebracho until all of the soluble matter of the extract enters into solution, the insoluble matter falling through the screen 29, to be subsequently discharged through the delivery pipe 9, and the solution discharged through the delivery pipe 27.

In this application I have stated the maximum temperature of the circulating fluid as 175° Fahrenheit. I wish it understood that this temperature may be increased or diminished, in accordance with the character of the quebracho treated, and by the term "character", I mean the amount or condition of the tannin carried thereby. Samples of quebracho will be rendered insoluble when treated in the atmosphere with water of 125° Fahrenheit; with others, the temperature of the water may be carried up to 220° Fahrenheit. I have chosen 175° as being the temperature best adapted to the average quality of quebracho.

Having thus described my invention, I claim:

1. The herein described method which consists in subjecting solid extract of quebracho while contained in a closed vessel and therefore not subject to the action of the atmosphere, to the action of circulating water maintained at a temperature not higher than 175° Fahrenheit, and then drawing off the solution and insoluble matters separately.

2. The herein described method which consists in immersing solid extract of quebracho in a vessel closed to the atmosphere, then introducing steam to heat the water and producing a circulation of the water through the quebracho, and limiting the heat imparted to the water to 175° Fahrenheit, then drawing off the solution and insoluble matters separately.

In testimony whereof, I affix my signature, in the presence of two witnesses.

JOSIAH MASON FISKE.

Witnesses:
HELEN E. KOELSCH,
MARCEL MULET.